United States Patent
Ishii et al.

(10) Patent No.: US 8,955,484 B2
(45) Date of Patent: Feb. 17, 2015

(54) AIR INTAKE CONTROL VALVE

(75) Inventors: Masato Ishii, Kariya (JP); Yusuke Yoshida, Kitanagoya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 515 days.

(21) Appl. No.: 13/302,495

(22) Filed: Nov. 22, 2011

(65) Prior Publication Data

US 2012/0132169 A1 May 31, 2012

(30) Foreign Application Priority Data

Nov. 30, 2010 (JP) .................................. 2010-266752

(51) Int. Cl.
| | | |
|---|---|---|
| F02M 35/10 | (2006.01) | |
| F02B 27/02 | (2006.01) | |
| F02D 9/10 | (2006.01) | |

(52) U.S. Cl.
CPC ...... *F02M 35/10065* (2013.01); *F02B 27/0252* (2013.01); *F02D 9/101* (2013.01); *F02D 9/1045* (2013.01); *F02D 9/108* (2013.01); *F02M 35/10045* (2013.01); *F02M 35/10321* (2013.01); *F02M 35/1036* (2013.01); *F02B 27/021* (2013.01); *F02B 27/0273* (2013.01); *Y02T 10/146* (2013.01)
USPC ............. 123/184.44; 123/184.49; 123/184.59

(58) Field of Classification Search
USPC ............. 123/184.25, 184.26, 184.35, 184.36, 123/184.43, 184.44, 184.48, 184.49, 123/184.53, 184.55, 184.56, 184.59
See application file for complete search history.

(56) References Cited

U.S. PATENT DOCUMENTS

| | | | |
|---|---|---|---|
| 2,470,925 | A | 5/1949 | Fredrickson |
| 3,184,213 | A | 5/1965 | Anderson |
| 4,337,956 | A | 7/1982 | Hopper |
| 4,794,886 | A | 1/1989 | Iwamuro et al. |
| 6,796,280 | B2 | 9/2004 | Yamamoto et al. |
| 7,131,416 | B2 | 11/2006 | Sasaki et al. |
| 7,997,247 | B2 | 8/2011 | Akihisa et al. |

(Continued)

FOREIGN PATENT DOCUMENTS

| | | |
|---|---|---|
| DE | 102 56 688 A1 | 6/2003 |
| DE | 102 58 068 A1 | 7/2003 |

(Continued)

OTHER PUBLICATIONS

Extended European Search Report dated Mar. 28, 2012, issued by the European Patent Office in the corresponding European Application No. 11189507.4. (4 pages).

(Continued)

*Primary Examiner* — Noah Kamen
(74) *Attorney, Agent, or Firm* — Buchanan Ingersoll & Rooney PC (57) ABSTRACT

An air intake control valve includes a body extending to divide an inner portion of a surge tank of a multi-cylinder internal combustion engine into two portions, the body serving as a divided surface to divide the inner portion of the surge tank into the two portions, a valve element operated to rotate for opening and closing a fluid passage formed at the body, and a seal member sealing between a sealed surface of the surge tank and an outer periphery of the body, the seal member including a seal portion constituted by two contact portions that make contact with the sealed surface in a state where the two contact portions extend in directions opposite from each other relative to the divided surface.

20 Claims, 5 Drawing Sheets

(56) References Cited

U.S. PATENT DOCUMENTS

| | | |
|---|---|---|
| 2002/0195076 A1 | 12/2002 | Nomizo et al. |
| 2003/0101966 A1 | 6/2003 | Hattori et al. |
| 2003/0111036 A1 | 6/2003 | Nomura et al. |
| 2004/0123826 A1 | 7/2004 | Yamamoto et al. |
| 2005/0073110 A1 | 4/2005 | Armour et al. |
| 2005/0109970 A1 | 5/2005 | Masui et al. |
| 2006/0016415 A1 | 1/2006 | Sasaki et al. |

FOREIGN PATENT DOCUMENTS

| | | |
|---|---|---|
| DE | 10 2004 050 094 A1 | 5/2005 |
| GB | 933588 A | 8/1963 |
| JP | 63-156422 U | 10/1988 |
| JP | 07-310828 A | 11/1995 |
| JP | 2004-116357 A | 4/2004 |
| JP | 2008-298055 A | 12/2008 |

OTHER PUBLICATIONS

Chinese Office Action (Notification of the First Office Action) dated Jan. 30, 2014 in corresponding Chinese Application No. 201110389586.1 and an English Translation of the Chinese Office Action. (20 pgs).

Chinese Office Action dated Jul. 1, 2014, issued by the Chinese Patent Office in corresponding Chinese Patent Application No. 201110389586 with English translation (23 pages).

Japanese Office Action dated Jul. 1, 2014, issued by the Japan Patent Office in corresponding Japanese Patent Application No. 2010-266752 with English translation (4 pages).

Communication of a Notice of Opposition issued on Dec. 17, 2014, by the European Patent Office in European Patent Application No. 11189507. (19 pages).

AIR INTAKE CONTROL VALVE

CROSS REFERENCE TO RELATED APPLICATIONS

This application is based on and claims priority under 35 U.S.C. §119 to Japanese Patent Application 2010-266752, filed on Nov. 30, 2010, the entire content of which is incorporated herein by reference.

TECHNICAL FIELD

This disclosure generally relates to an air intake control valve.

BACKGROUND DISCUSSION

In a multi-cylinder internal combustion engine (hereinafter simply referred to as an engine) for a vehicle, for example, an air intake control valve is known to be provided at an air intake system including a port and a surge tank. Such air intake control valve includes a body extending so as to divide an inner portion of the surge tank into two portions, a valve element operated to rotate so as to open and close a fluid passage formed at the body, and a seal member sealing between an inner surface of the surge tank and an outer periphery of the body. The air intake control valve is mounted so as to close a connection bore formed at a partition wall separating the inner portion of the surge tank into the two portions, i.e., two chambers. The valve element of the air intake control valve is appropriately driven to rotate by an actuator so as to obtain a connected state where the two chambers are connected to each other and a disconnected state where the two chambers are disconnected from each other. As a result, a resonance frequency of the air intake system is changed to thereby obtain a supercharging effect over a wide range of an engine operation. In a case where an air leakage increases between the two chambers (upper and lower chambers), an expected resonance frequency may not be obtained in the air intake system of the engine, which leads to a deterioration of the supercharging effect.

Figure 9A:
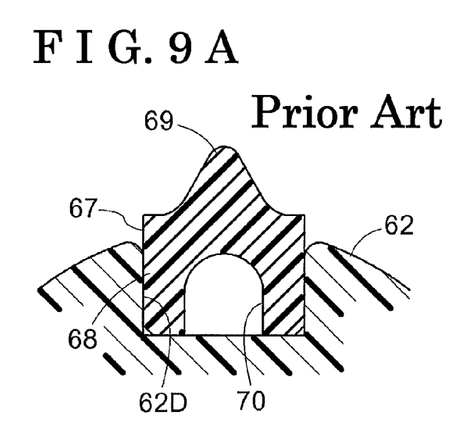
FIGS. 9A and 9B are cross-sectional views illustrating operations of a seal member according to a known air intake control valve.
Figure 9B:
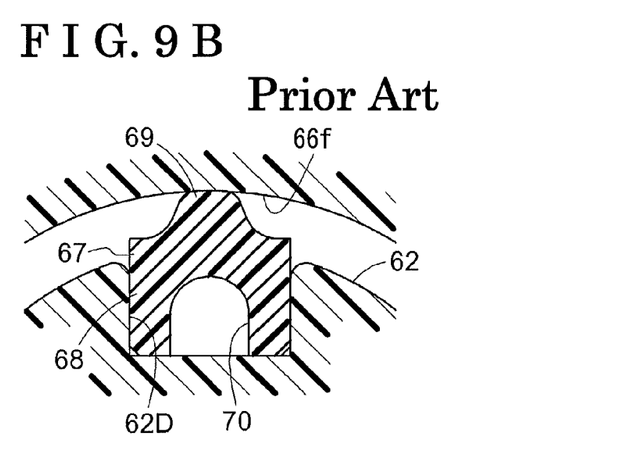

JP2004-116357A (hereinafter referred to as Reference 1) discloses such air intake control valve as illustrated in FIGS. 9A and 9B in which a gasket (seal member) 67 formed into a string shape and made of an elastic material is attached to an outer periphery of a frame (body) 62 holding a valve element. In a case where the body 62 is attached to a sealed surface 66f of a partition wall formed at a surge tank, a gap between the sealed surface 66f and the body 62 is sealed by the seal member 67 that is pressed against the sealed surface 66f of the partition wall. As a result, an air leakage between two chambers (upper and lower chambers) is restrained.

As illustrated in FIG. 9A, according to the air intake control valve disclosed in Reference 1, the seal member 67 includes a fitting portion 68 fitted to a seal groove 62D that is formed at the outer periphery of the body 62. The fitting portion 68 substantially includes a rectangular cross section. The seal member 67 also includes an end seal portion 69 vertically extending from the fitting portion 68 towards the sealed surface 66f. The end seal portion 69 substantially includes a semicircular cross section symmetric to a divided surface constituted by the body 62 so as to divide an inner portion of the surge tank into two portions. In a case where the body 62 is attached to the sealed surface 66f, the end seal portion 69 is squashed towards the fitting portion 68 by the sealed surface 66f while the symmetric shape of the end seal portion 69 relative to the divided surface is maintained as illustrated in FIG. 9B. According to the aforementioned structure, in order to restrain the air leakage because of the deformation of the end seal portion 69 in an oblique or lateral direction that is caused by a high air pressure from either of the upper and lower chambers, a rigidity to some extents may be required to the end seal portion 69. Therefore, an apex angle of a triangular-shaped cross section constituting the end seal portion 69 may be inhibited from having too acute angle and additionally the end seal portion 69 may be made of a material having relatively high rigidity.

As a result, in a case where the body 62 is attached to the sealed surface 66f, a large load is necessary for bringing the end seal portion 69 having the semicircular cross section to be deformed so as to be compressed against the fitting portion 68. A contact area between the sealed surface 66f and the end seal portion 69 also increases, which may lead to an increase of a contact pressure or a frictional resistance, for example, acting between the sealed surface 66f and the end seal portion 69. Consequently, the attachment of the body 62 relative to the sealed surface 66f may be difficult.

In addition, in a case where the body 62 is attached to the sealed surface 66f, the fitting portion 68 of the seal member 67 is likely to disengage from the seal groove 62D formed at the outer periphery of the body 62 or to be partially pulled out in a direction where the body 62 is attached because of the high contact pressure, the frictional resistance, and the like acting between the sealed surface 66f and the end seal portion 69. Thus, the sealing ability of the end seal portion 69 may be deteriorated. Further, the body 62 may be deformed by a reaction force that is generated at the body 62 by means of the end seal portion 69, which may lead to the air leakage between the body 62 and the fitting portion 68 of the seal member 67.

In Reference 1, the seal member 67 may have an arched shape in a cross section by including a groove portion 70 having a tunnel shape at a lower end of the fitting portion 68 to thereby reduce the reaction force generated at the fitting portion 68 of the seal member 67. However, because of the high rigidity of the material constituting the seal member 67, an easy deformation is insufficient for the entire seal member 67. As a result, a large compression by a low load may be impossible and therefore an issue of an excessive load when the body 62 is inserted into the sealed surface 66f may not be effectively dissolved.

JP63-156422U discloses an air intake control valve including two projections that serve as the end seal portion so as to extend in parallel to a divided surface constituted by a body. However, in the same way as Reference 1, each of the projections vertically projects towards a sealed surface, which may also raise issues such as a difficulty in attaching the body to the sealed surface, the deterioration of the sealing ability because of the disengagement or the pull-out of a fitting portion of a seal member, an air leakage caused by the deformation of the body, or the like.

A need thus exists for an air intake control valve which is not susceptible to the drawback mentioned above.

SUMMARY

According to an aspect of this disclosure, an air intake control valve includes a body extending to divide an inner portion of a surge tank of a multi-cylinder internal combustion engine into two portions, the body serving as a divided surface to divide the inner portion of the surge tank into the two portions, a valve element operated to rotate for opening and closing a fluid passage formed at the body, and a seal member sealing between a sealed surface of the surge tank and an outer periphery of the body, the seal member including a seal portion constituted by two contact portions that make contact with the sealed surface in a state where the two contact portions extend in directions opposite from each other relative to the divided surface.

According to another aspect of this disclosure, an air intake control valve includes a body dividing an inner portion of a surge tank into two portions, a valve element operated to rotate for opening and closing a fluid passage formed at the body, and a seal member sealing between a sealed surface of the surge tank and an outer periphery of the body, the seal member including a seal portion constituted by two contact portions that make contact with the sealed surface in a state where the two contact portions extend in directions away from each other.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
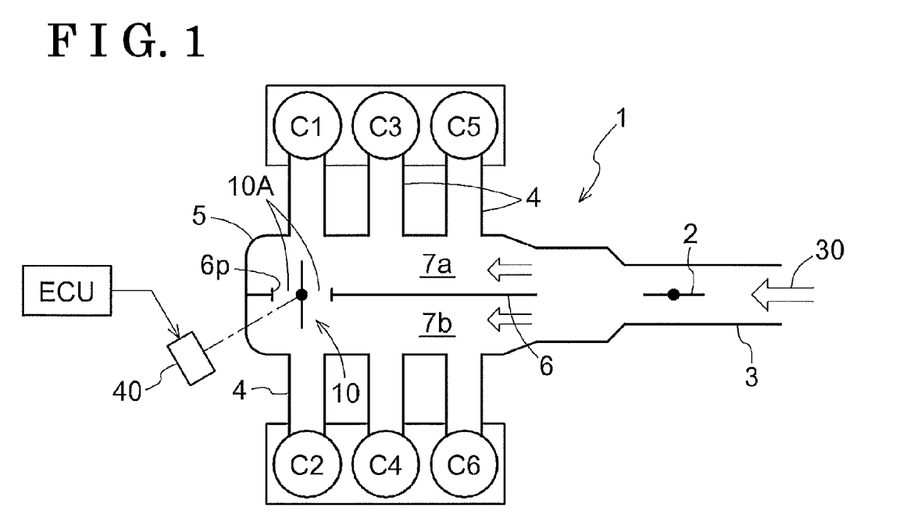
FIG. 1 is a schematic view illustrating an air intake system of a multi-cylinder internal combustion engine according to an embodiment disclosed here.

An embodiment will be explained with reference to the attached drawings. FIG. 1 illustrates a relationship between an air intake system 1 for a V-type 6-cylinder engine (hereinafter simply referred to as an engine), and six cylinders C1, C2, C3, C4, C5, and C6 (hereinafter referred to as cylinders C1 to C6 when collectively described). The air intake system 1 includes an air intake passage 3 supplied with air taken in through an air filter, and a surge tank 5 disposed between the air intake passage 3 and the cylinders C1 to C6. A throttle valve 2 is provided at the air intake passage 3. The surge tank 5 is divided into first and second surge chambers 7a and 7b by means of a partition wall 6. The cylinders C1, C3, and C5 are connected to the first chamber 7a provided at an upper side in FIG. 1 via respective intake pipes 4. In the same manner, the cylinders C2, C4, and C6 are connected to the second surge chamber 7b provided at a lower side in FIG. 2 via the respective intake pipes 4.

In the air intake system 1, a resonance of a manifold air pressure is generated at a predetermined engine rotational range. Such resonance is generated in a case where a frequency (a resonance frequency) that is determined on a basis of a volume, a length, and the like of the surge tank 5 and/or the air intake passage 3 provided at an upstream side of the surge tank 5, for example, and an intake air frequency of the cylinders C1 to C6 match each other. When the resonance is generated, a pressure at the air intake system 1 increases, which leads to a supercharging effect. Because of the supercharging effect, an intake air volume of each of the cylinders C1 to C6 increases to thereby improve an engine output.

In order to generate the aforementioned resonance, an air intake control valve 10 is provided at the air intake system 1 so as to achieve an open state where the first and second surge chambers 7a and 7b are connected to each other and a closed state where the first and second surge chambers 7a and 7b are disconnected to each other. When the volume of the surge tank 5 relative to the cylinders C1 to C6 changes, the resonance frequency of the air intake system 1 changes. Thus, the air intake control valve 10 is appropriately controlled to open or close depending on an operation condition of the engine to thereby change the resonance frequency of the air intake system 1 and obtain the supercharging effect. As a result, the increase of the engine output at a wide range of the engine rotational range is achievable.

The first surge chamber 7a provided at the upper side and the second surge chamber 7b provided at the lower side are connected to each other by means of a cutout 6p formed at a portion of the partition wall 6. The air intake control valve 10 that is enlarged so as to improve the supercharging effect is mounted on the cutout 6p. An actuator 40 for opening and closing the air intake control valve 10 may be an electrically controlled type so as to be driven by an electric signal sent from an ECU (an electronic control unit) that is mounted at a vehicle.

In a case where the engine is driven while the air intake control valve 10 is in a fully closed state, the pressure is alternately generated at the first and second surge chambers 7a and 7b that are arranged next to each other via the partition wall 6 because the air intake is sequentially performed by the cylinders C1 to C6. When a fluid leakage may occur between the cutout 6p and the air intake control valve 10 while the air intake control valve 10 is in the closed state, for example, an expected resonance frequency is not obtained at the air intake system 1, which leads to a deterioration of the supercharging effect.

Figure 2:
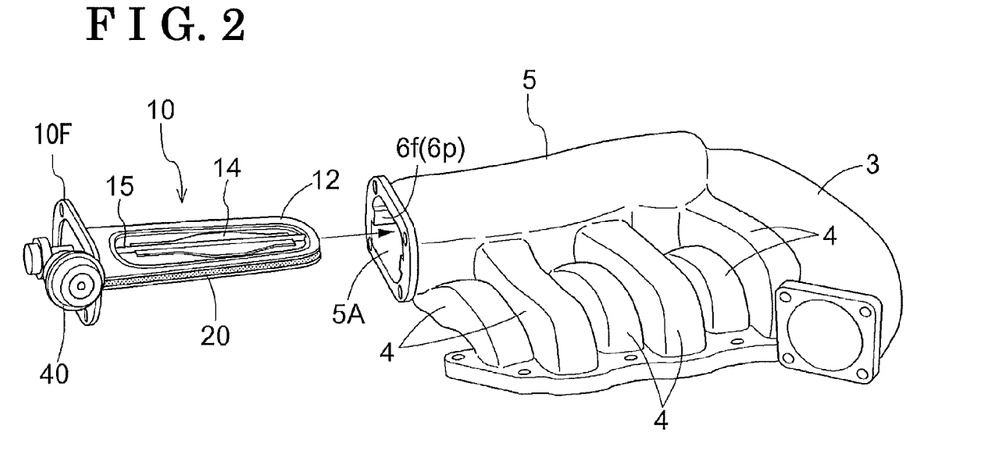
FIG. 2 is a perspective view illustrating a state where an air intake control valve is attached to a surge tank according to the embodiment.
Figure 3:
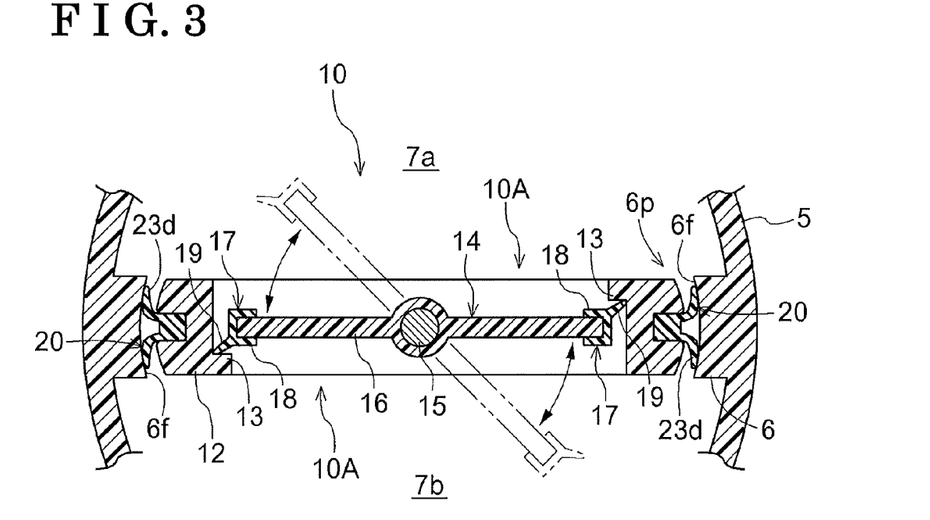
FIG. 3 is a cutaway front view schematically illustrating the air intake control valve mounted on the surge tank.
Figure 4:
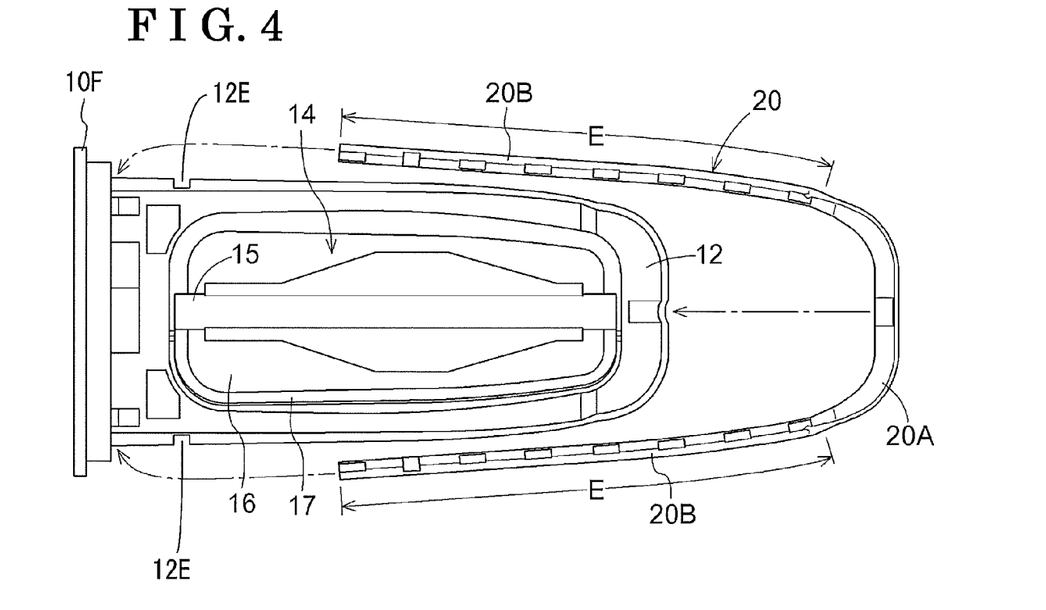
FIG. 4 is a schematic plan view illustrating the air intake control valve and a seal member.

As illustrated in FIGS. 2 to 4, the air intake control valve 10 includes a body 12 attached to the cutout 6p of the partition wall 6 and a valve element 14 supported by a shaft 15. Both ends of the shaft 15 are pivotally supported by respective portions of the body 12. The body 12 is formed into a frame shape extending along the cutout 6p of the partition wall 6. A fluid passage 10A is formed at an inner side of the frame shape of the body 12. As illustrated in FIG. 3, a seal receiving portion 13 is formed at an inner peripheral surface of the body 12 so as to extend within the fluid passage 10A. The seal receiving portion 13 extends over a substantially entire inner periphery of the body 12. In FIG. 3, the closed position of the valve element 14 is illustrated by a solid line while the open position of the valve element 14 is illustrated by a chain double-dashed line.

As illustrated in FIG. 3, the valve element 14 includes a valve body 16 attached to the shaft 15 and formed into a resin-made plate shape, and an elastic seal member 17 arranged at a peripheral edge of the valve body 16 and made of rubber. The elastic seal member 17 includes an attachment portion 18 fitted to an outer periphery of the valve body 16 and a lip portion 19 projecting from a portion of a peripheral edge of the attachment portion 18 so as to incline close to a center of the valve element 14. Specifically, the lip portion 19 is connected to a portion of an outer periphery of the attachment portion 18 so as to extend and incline towards the center of the valve element 14. The actuator 40 brings the valve element 14 to rotate so as to obtain the open state (open position) where the first and second surge chambers 7a and 7b are connected (i.e., the open state of the fluid passage 10A) and obtain the closed state (closed position) where the first and second surge chambers 7a and 7b are disconnected (i.e., the closed state of the fluid passage 10A). In a case where the valve element 14 is in the closed position, the lip portion 19 is pressed against the seal receiving portion 13 to thereby disconnect the first and second surge chambers 7a and 7b from each other.

As illustrated in FIG. 2, the air intake control valve 10 is inserted into an opening portion 5A formed at the surge tank 5 opposite from the air intake passage 3 so as to be fixed to the surge tank 5 by means of a bolt, for example, that is inserted into a through-hole formed at a flange 10F of the air intake control valve 10. In a case where the air intake control valve 10 is mounted to the surge tank 5 in the aforementioned manner, an inner portion of the surge tank 5 is divided into two portions, i.e., the first surge chamber 7a and the second surge chamber 7b, by mean of the body 12 of the air intake control valve 10. That is, the body 12 serves as a divided surface to divide the inner portion of the surge tank 5 into the two portions. A sheet surface of FIG. 4 corresponds to the divided surface.

As illustrated in FIGS. 2 to 4, an outer peripheral seal member (a gasket) 20 (serving as an example of a seal member) formed into a strip shape and made of rubber is attached to an outer periphery of the body 12. In a case where the body 12 is mounted to the cutout 6p of the surge tank 5, a gap between the body 12 and an end surface 6f (serving as an example of a sealed surface) of the cutout 6p of the surge tank 5 is filled with the outer peripheral seal member 20, which leads to a high sealability. As illustrated in FIG. 4, because the body 12 substantially has a U-shape, the outer peripheral seal member 20 includes a center portion 20A attached to a tip end portion of the body 12 (i.e., a portion of the body 12 away from the flange 10F) and two side portions 20B extending from both ends of the center portion 20A. In FIG. 4, ranges where the two side portions 20B are arranged are indicated by arrows E respectively.

Figure 5A:
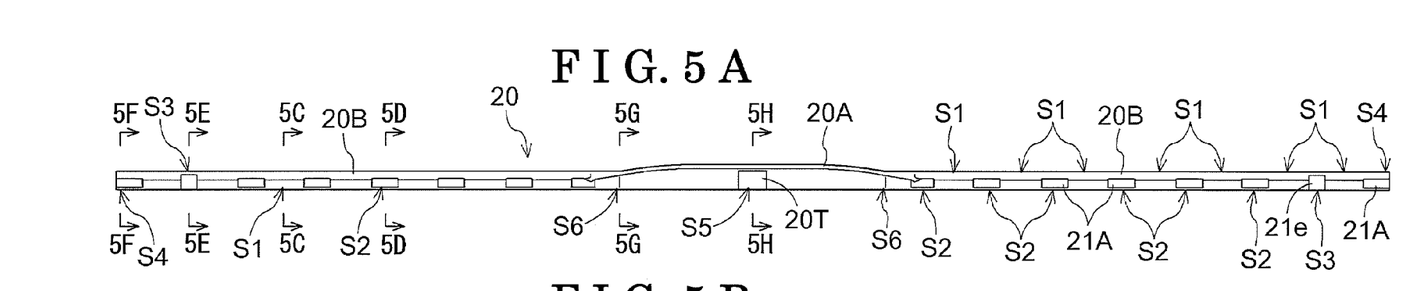
FIG. 5A is a side view of an outer peripheral seal member.
Figure 5B:
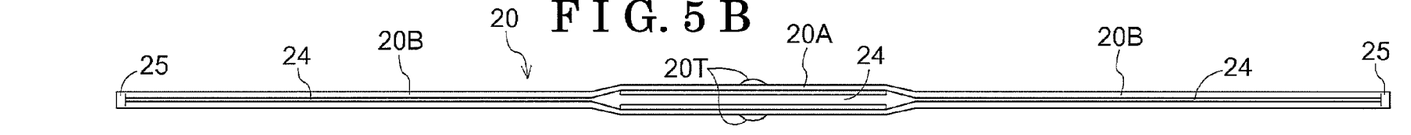
FIG. 5B is a plan view of the outer peripheral seal member.

FIGS. 5A and 5B are a side view and a plan view of the outer peripheral seal member 20 respectively in which the two side portions 20B extend along the divided surface constituted by the body 12 so as to be linear relative to the center portion 20A. The center portion 20A in the side view and the plan view is formed so that a width thereof is larger than those of the two side portions 20B. The outer peripheral seal member 20 before being attached to the body 12 is substantially formed into a linear shape as illustrated in FIGS. 5A and 5B. Then, the outer peripheral seal member 20 is attached to the body 12 in a state to be elastically deformed in a curved shape so as to conform to a shape of the body 12 as illustrated in FIG. 4.

Figure 6A:
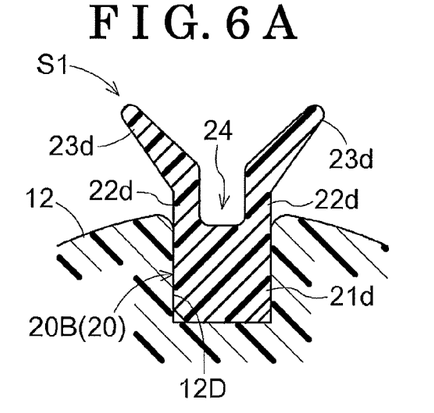
FIGS. 6A, 6B, and 6C are cross-sectional views illustrating operations of the outer peripheral seal member.
Figure 6B:
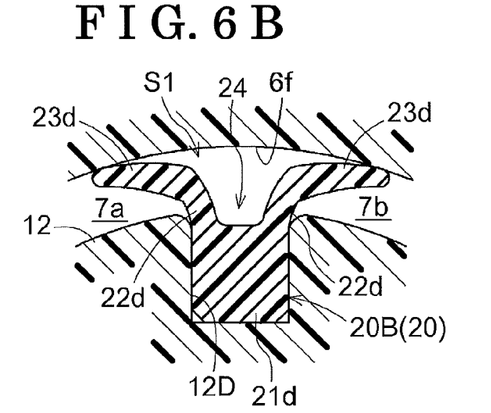
Figure 7:
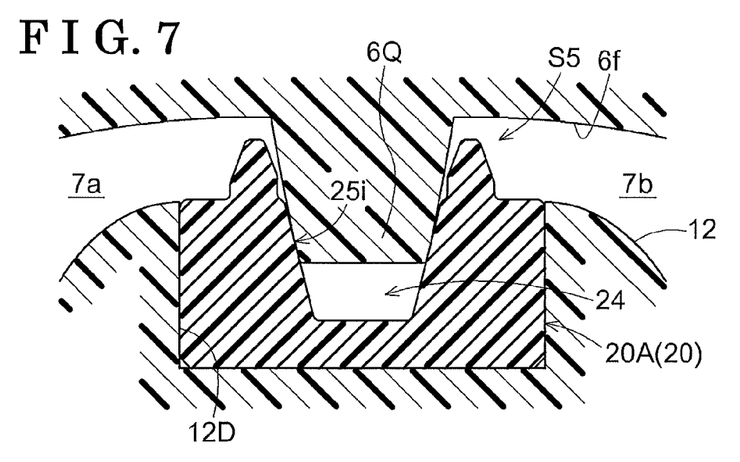
FIG. 7 is a plan view illustrating an operation of the outer peripheral seal member at a portion close to a tip end portion of the air intake control valve.

In a state where the body 12 is inserted and mounted to the cutout 6p of the surge tank 5, the center portion 20A engages with the surge tank 5 so that a groove (a clearance) 24 formed at an outer periphery of the center portion 20A engages with an engagement projection 6Q that projects towards the opening portion 5A from the end surface 6f of the cutout 6p as illustrated in FIG. 7. On the other hand, a projection such as the engagement projection 6Q is not formed at a portion of the end surface 6f positioned to face each of the two side portions 20B. A pair of first contact portions 23d basically formed into a Y-shape while having an opening as illustrated in FIG. 6A is pressed against the end surface 6f of the cutout 6p so as to further open as illustrated in FIG. 6B to thereby achieve the sealing state. According to the embodiment, contact portions such as the contact portions 23d are portions which are contactable with the end surface 6f in association with an increase of a pressure in each of the surge chambers 7a and 7b after the air intake control valve 10 is mounted to the surge tank 5 and the engine is started.

Figure 5C:
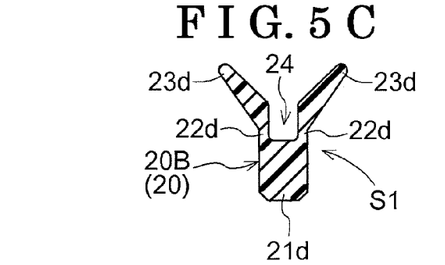
FIGS. 5C, 5D, 5E, 5F, 5G, and 5H are cross-sectional views taken along the lines 5C-5C, 5D-5D, 5E-5E, 5F-5F, 5G-5G, and 5H-5H in FIG. 5A and illustrating first, second, third, fourth, fifth, and sixth pattern portions of the outer peripheral seal member respectively.
Figure 5D:
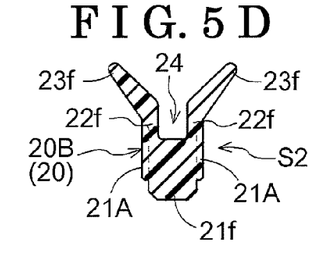

As illustrated in FIG. 5A, a greater portion of the two side portions 20B is constituted by first pattern portions S1 each having a cross-sectional shape as illustrated in FIG. 5C and second pattern portions S2 each having a cross-sectional shape as illustrated in FIG. 5D. The first pattern portions S1 and the second pattern portions S2 are alternately arranged to one another. As illustrated in FIG. 5C, each of the first pattern portions S1 includes a first fitting portion 21d (serving as an example of a supported portion) fitted to a seal groove 12D (see FIG. 6A) of the body 12 and substantially formed into a rectangular shape. The first pattern portion S1 also includes a pair of first intermediate portions 22d extending in parallel to each other towards the end surface 6f from both ends (i.e., right and left ends in FIG. 5C) of the first fitting portion 21d, and the pair of first contact portions 23d extending so as to be away or opposite from each other relative to the divided surface constituted by the body 12 from ends (i.e., upper ends of the first intermediate portions 22d in FIG. 5C) of the respective first intermediate portions 22d. Specifically, the first contact portions 23d extend obliquely in an upward direction so as to be away from each other (i.e., extend obliquely in an upward and outward direction relative to the divided surface) in a symmetric manner.

As illustrated in FIG. 5D, each of the second pattern portions S2 includes a second fitting portion 21f (serving as an example of the supported portion) fitted to the seal groove 12D of the body 12 and substantially formed into a rectangular shape. The second pattern portion S2 also includes a pair of second intermediate portions 22f extending in parallel to each other towards the end surface 6f from both ends (i.e., right and left ends in FIG. 5D) of the second fitting portion 21f, and a pair of second contact portions 23f extending so as to be away or opposite from each other relative to the divided surface constituted by the body 12 from ends (i.e., upper ends of the second intermediate portions 22f in FIG. 5D) of the respective second intermediate portions 22f. Specifically, the second contact portions 23f extend obliquely in an upward direction so as to be away from each other (i.e., extend obliquely in an upward and outward direction relative to the divided surface) in a symmetric manner.

Each of the first pattern portions S1 and each of the second pattern portions S2 basically include the same cross-sectional shape. The difference between the first and second pattern portions S1 and S2 is that padding portions 21A are formed at both sides (i.e., right and left sides in FIG. 5D) of the second fitting portion 21f of the second pattern portion S2 so as to have a larger width than the first fitting portion 21d of the first pattern portion S1. A width of a portion of the seal groove 12D of the body 12 facing the two side portions 20B is constant over an entire length. Therefore, when the outer peripheral seal member 20 is attached to the body 12, the two side portions 20B engage with the body 12 in a state where the second fitting portion 21f of each of the second pattern portions S2 of which the width is sufficiently larger than the width of the seal groove 12D is press-fitted to the seal groove 12D. On the other hand, the width of the first fitting portion 21d of each of the first pattern portions S1 is formed to be slightly smaller than the width of the seal groove 12D. Therefore, the first fitting portion 21d engages with the seal groove 12D without the press-fitting. Because the outer peripheral seal member 20 is mounted to the body 12 in a state where the first fitting portions 21d of the first pattern portions S1 in addition to the second fitting portions 21f of the second pattern portions S2 are pressed against a bottom portion of the seal groove 12D, an air leakage via lower surfaces of the first and second fitting portions 21d and 21f is inhibited.

Before the outer peripheral seal member 20 receives an external force, the pair of first contact portions 23d extends so as to be away from each other relative to the divided surface constituted by the body 12, i.e., extends obliquely in an outward direction. In the same way, the pair of second contact portions 23f extends so as to be away from each other relative to the divided surface, i.e., extends obliquely in the outward direction. In addition, the width of each of the first intermediate portions 22d and the first contact portions 23d is formed to be sufficiently smaller than the width of the first fitting portion 21d while the width of each of the second intermediate portions 22f and the second contact portions 23f is formed to be sufficiently smaller than the width of the second fitting portion 21d. Thus, in a case of attaching the air intake control valve 10 (the outer peripheral seal member 20) to the surge tank 5, the first intermediate portions 22d, the second intermediate portions 22f, the first contact portions 23d, and the second contact portions 23f are easily elastically deformed so as to be inclined towards the body 12 in respective directions based on the contact of the first intermediate portions 22d, the second intermediate portions 22f, the first contact portions 23d, and the second contact portions 23f relative to the end surface 6f. As a result, the air intake control valve 10 is smoothly inserted and mounted to the surge tank 5. Further, because a reaction force that the body 12, having a frame shape, receives by the outer peripheral seal member 20 is reduced in the process of mounting or attaching the air intake control valve 10 to the surge tank 5 or after the air intake control valve 10 is mounted to the surge tank 5, the deformation of the body 12 caused by such reaction force is retrained. An adverse affect on the sealing ability between the body 12 and the cutout 6p, between the body 12 and the valve element 14, and the like based on the deformation of the body 12 may be avoided accordingly.

The groove 24 having a sufficient width is formed between each of the pair of first intermediate portions 22d and the pair of second intermediate portions 22f. Thus, the width of each of the pair of first intermediate portions 22d and the pair of second intermediate portions 22f (each serving as an example of a deformation portion) is specified to be smaller than the width of a base portion of each of the pair of first contact portions 23d and the pair of second contact portions 23f. That is, each of the pair of first intermediate portions 22d and the pair of second intermediate portions 22f has a low rigidity. On the other hand, each of the pair of first contact portions 23d and the pair of second contact portions 23f has a high rigidity because of being gradually widen from a tip end portion to the base portion. As compared to the pair of first intermediate portions 22d and the pair of second intermediate portions 22f, the pair of first contact portions 23d and the pair of second contact portions 23f are not easily deformed. Therefore, in a case where the air intake control valve 10 is inserted and mounted to the surge tank 5, the pair of first intermediate portions 22d and the pair of second intermediate portions 22f are elastically deformed by making contact with the end surface 6f prior to the other members. The pair of first contact portions 23d and the pair of second contact portions 23f are not easily deformed except for the tip end portions.

According to the aforementioned configuration, the contact of the outer peripheral seal member 20 relative to the end surface 6f in a case where the air intake control valve 10 is inserted and mounted to the surge tank 5 is limited to portions at inner sides of the first and second contact portions 23d and 23f in the vicinity of the tip end portions thereof. That is, a contact area of the outer peripheral seal member 20 relative to the end surface 6f is minimized and therefore the insertion load of the air intake control valve 10 decreases, which leads to an easy insertion and mounting of the air intake control valve 10. As a result, productivity increases, which may avoid an investment in facility for a large insertion load of the air intake control valve 10. In addition, because of the decrease of the insertion load, a quality defect such as a dislocation of the outer peripheral seal member 20 when the air intake control valve 10 is assembled to the surge tank 5 is avoidable.

Figure 6C:
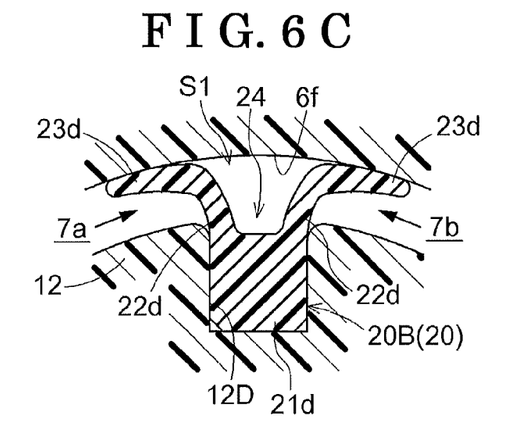

After the air intake control valve 10 is mounted to the surge tank 5, the first and second contact portions 23d and 23f (each serving as an example of a seal portion) are pressed against the end surface 6f of the partition wall 6 by means of a relatively weak restoring force of the first and second intermediate portions 22d and 22f. In a case where the valve element 14 is in the fully closed state, an air intake pulsation is alternately applied to the first and second surge chambers 7a and 7b. At this time, as illustrated in FIG. 6C, a greater part of the first contact portions 23d (and the second contact portions 23f) facing the first and second surge chambers 7a and 7b is strongly pressed against the cutout 6p (the end surface 6f). Thus, the sealing ability is automatically enhanced and the high air tightness is maintained. In order to ensure the sealing ability in a low pressure state, the width of each of the tip end portions of the first and second contact portions 23d and 23f (each serving as an example of the deformation portion) is relatively small so that the first and second contact portions 23d and 23f are easily elastically deformed by the contact with the cutout 6p (the end surface 6f).

Bottom plane portions of the grooves 24 respectively provided between the first intermediate portions 22d and between the second intermediate portions 22f are each formed into a solid shape while including a large amount of rubber so as to have a large rigidity. Accordingly, in a case where the outer peripheral seal member 20 is assembled on the seal groove 12D of the body 12, the load is applied to the bottom plane portions of the grooves 24 so that a damage, breakage or the like on each of the first and second contact portions 23c, 23d, the first and second intermediate portions 22d, 22f, and the like is inhibited.

Both side corners (i.e., right and left corners in FIGS. 6A, 6B, and 6C) of each of the grooves 24 are formed into round cross sectional shapes each including an arc relative to a center of a void of the groove 24. Thus, a stress generated when each of the first and second intermediate portions 22d and 22f is deformed is dispersed. As a result, a fatigue resistance of each of the first and second contact portions 23d, 23f, and the first and second intermediate portions 22d and 22f increases. In addition, because of the grooves 24, a reduction in an amount of rubber of the outer peripheral seal member 20 and a cost reduction thereof are achieved as well as a lightweight of the outer peripheral seal member 20 as a whole.

As illustrated in FIG. 4, a curvature radius of each curved portion of the body 12 positioned to face a portion of each of the two side portions 20B in the vicinity of the center portion 20A (i.e., bent portions of the two side portions 20B) is small.

Thus, in a case where the outer peripheral seal member 20 is attached to the outer periphery of the body 12, the bent portions of the two side portions 20B in the vicinity of the center portion 20A are bent and deformed so as to conform to the curvature radius of the curved portions of the body 12. Then, the first and second contact portions 23d and 23f may be folded down toward the body 12, which may inhibit the appropriate contact relative to the cutout 6p after the air intake control valve 10 is mounted to the surge tank 5.

Therefore, in the bent portions of the two side portions 20B, in a state before the bent portions are bent and deformed, the tip ends of the pair of first contact portions 23d are arranged so as to be close to each other in association with the decrease of the curvature radius. In the same way, in the bent portions of the two side portions 20B, the tip ends of the pair of second contact portions 23f are arranged so as to be close to each other in association with the decrease of the curvature radius. That is, in a case where the two side portions 20B are bent and deformed so that the outer peripheral seal member 20 is mounted to the body 12, the first contact portions 23d and the second contact portions 23f in the bent portions of the two side portions 20B are appropriately bent or inclined towards the body 12 so that a distance between the tip ends of the first contact portions 23d and a distance between the tip ends of the second contact portions 23f in the bent portions of the two side portions 20B are each substantially equal to a distance between the contact portions 23d or 23f in portions other than the bent portions (i.e., straight portions) of the two side portion 20B. As a result, the appropriate contact of the outer peripheral seal member 20 relative to the end surface 6f is achieved.

Specifically, in order to arrange the first contact portions 23d to be close to each other and the second contact portions 23f to be close to each other, an angle formed between the first contact portions 23d and an angle formed between the second contact portions 23f are each defined to be small. Alternatively, the aforementioned angles may not be changed and a distance between the first intermediate portions 22d and a distance between the second intermediate portions 22f may be reduced. Further alternatively, instead of arranging the tip ends of the first contact portions 23d to be close to each other and the tip ends of the second contact portions 23f to be close to each other, an extending length of each of the first contact portions 23d and the second contact portions 23f in the bent portions of the two side portions 20B may be longer than the extending length of each of the first and second contact portions 23d and 23f in the straight portions of the two side portions 20B in a state before the outer peripheral seal member 20 is bent and deformed. Further alternatively, a state where the tip ends of the first contact portions 23d are arranged to be close to each other and the tip ends of the second contact portions 23f are arranged to be close to each other in the bent portions of the two side portions 20B, and a state where the extending length of each of the first and second contact portions 23d and 23f in the bent portions of the two side portions 20B are larger than the extending length of each of the first and second contact portions 23d and 23f in the straight portions of the two side portions 20B may be applied at the same time.

Figure 5E:
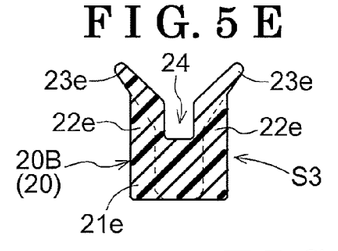
Figure 5F:
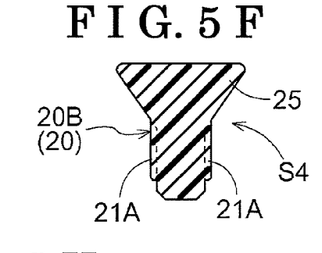
Figure 5G:
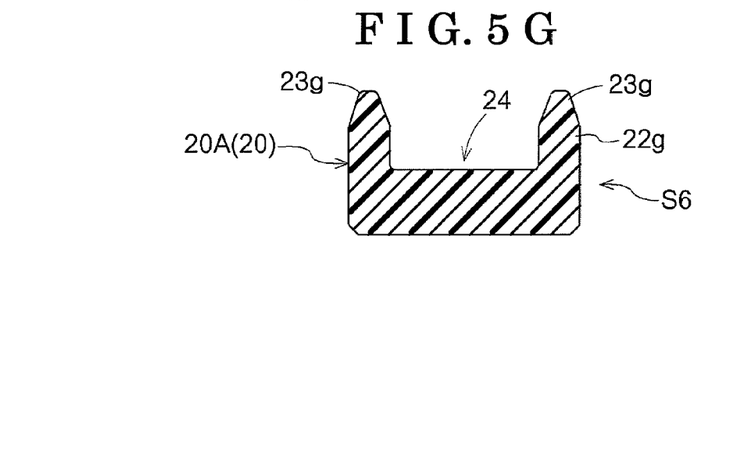

As illustrated in FIGS. 5A and 5F, fourth pattern portions S4 are provided at most end portions of the two side portions 20B respectively. Each of the fourth pattern portions S4 is formed into a cross-sectional shape similar to that of the second pattern portion S2 but the groove 24 and a gap (a space) between the second contact portions 23f are eliminated. In addition, as illustrated in FIGS. 5A and 5E, third pattern portions S3 are provided, each of which is arranged between two of the first pattern portions S1 arranged close to the center of the outer peripheral seal member 20 relative to the fourth pattern portions S4. Each of the third pattern portions S3 includes a third fitting portion 21e of which the width is larger than the second fitting portion 21f of the second pattern portion S2, a pair of third intermediate portions 22e, and a pair of third contact portions 23e. The third fitting portion 21e serves as an example of the supported portion while the third contact portions 23e each serves as an example of the seal portion.

The third pattern portions S3 serve as engagement portions inserted and fitted to respective lock grooves 12E (see FIG. 4) formed at two portions of the body 12 in the vicinity of a base portion thereof (i.e., a portion of the body 12 close to the flange 10F) as illustrated in FIG. 4. The lock grooves 12E are arranged slightly closer to the flange 10F as compared to a distance from a center of the outer peripheral seal member 20 (which corresponds to a 5H-5H plane in FIG. 5A) in a longitudinal direction thereof to each of the third pattern portions S3 in a state where the external force is not applied to the outer peripheral seal member 20.

Then, in a case of attaching the outer peripheral seal member 20 to the outer periphery of the body 12, the first intermediate portions 22d of the first pattern portions S1 of the outer peripheral seal member 20 are brought to engage with the tip end portion of the body 12. Then, both of the end portions of the outer peripheral seal member 20 are pulled by a force exceeding a predetermined value in a direction of the flange 10F so that the third fitting portions 21e of the third pattern portions S3 are fitted to the lock grooves 12E to thereby realize a tightening and fitting means.

Hardness and strength of a rubber material constituting the outer peripheral seal member 20 are defined to be relatively high so as to respond to alcohol fuel. Thus, a reaction force (a rubber reaction force) generated at portions of the outer peripheral seal member 20 attached to corner portions of the body 12 each having a U-shape is relatively large so as to return to an original linear shape. However, the positions of the lock grooves 12E are defined in the aforementioned manner as the tightening and fitting means, thereby effectively restraining a lifting-up, disengagement, or the like of the outer peripheral seal member 20 by the rubber reaction force, because of a tensile force maintained at the outer peripheral seal member 20 after the outer peripheral seal member 20 is attached to the body 12.

In order to inhibit the disengagement of the center portion 20A from the body 12, the tightening and fitting means may be provided between the both ends of the center portion 20A and the body 12. The tightening and fitting means provided at four portions or more of the outer peripheral seal member 20 may effectively inhibit the disengagement of the outer peripheral seal member 20 from the body 12 caused by the rubber reaction force of the outer peripheral seal member 20. Further, the tightening and fitting means provided at four or more portions in an asymmetrical manner may inhibit a wrong assembly.

The positions of the lock groves 12E are specified in the aforementioned manner so that the first intermediate portions 22d of the first pattern portions S1 engage with the tip end portion of the body 12, and then the third pattern portions S3 are inserted and fitted to the lock grooves 12E. Then, the second fitting portions 21f of the second pattern portions S2 are inserted and fitted to the seal groove 12D one by one, which leads to an easy assembly of the outer peripheral seal member 20.

The fourth pattern portions S4 provided at the most end portions of the outer peripheral seal member 20 respectively form ribs (specifically, each of the fourth pattern portions S4 has a rib portion 25) while having no grooves or spaces, thereby being connected to the respective adjacent first pattern portions S1. The fourth pattern portions S4 restrain the air leakage from one of the first and second surge chambers 7a and 7b to the other of the first and second surge chambers 7a and 7b via spaces such as those between the contact portions and between the intermediate portions.

The fourth pattern portions S4 constituting the ribs may not be only provided at the both end portions of the outer peripheral seal member 20 but also provided at any other portions of the outer peripheral seal member 20. The aforementioned ribs (i.e., the fourth pattern portions S4) restrain the contact portions 23d, 23e and 23f from being inclined or folded because of a pressure difference between the first and second surge chambers 7a and 7b. As a result, the high sealing ability is maintained even under a pressure pulsation. In addition, in order to easily attach the outer peripheral seal member 20 to the seal groove 12D, a groove having a tunnel shape may be intermittently formed at the bottom surface of the outer peripheral seal member 20. As a result, the reduction of the amount of rubber and the light-weight of the outer peripheral seal member 20 as a whole are further enhanced.

A distance between the fourth pattern portion S4 forming the rib and the adjacent third pattern portion S3 is specified to be slightly longer than a length of a corresponding portion of the groove 12D formed at the body 12 in a state where the outer peripheral seal member 20 is in the linear shape. Therefore, both end surfaces of the both end portions of the outer peripheral seal member 20 are elastically pressed against the end surface of the flange 10F of the body 12. The air leakage between the first and second surge chambers 7a and 7b at the both end portions of the outer peripheral seal member 20 is inhibited, which ensures the further high sealing ability.

Figure 5H:
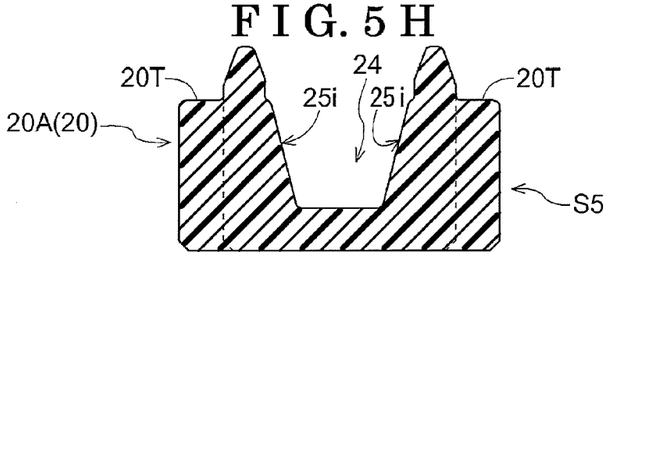

The groove 24 formed at a fifth pattern portion S5 that occupies a majority of the length of the center portion 20A includes a pair of side surface portions 25i engaging with the engagement projection 6Q that projects from the body 12. As illustrated in FIG. 5B, the fifth pattern portion S5 includes a center projection 20T having an arc-shape in a plan view and formed at a center of the outer peripheral seal member 20 in the longitudinal direction thereof. FIG. 5H illustrates a cross section of a portion corresponding to the center projection 20T. An area sandwiched between two dashed lines in FIG. 5H illustrates a cross-sectional shape of the fifth pattern portion S5 not provided with the center projection 20T. A wide-shaped portion is formed at the seal groove 12D of the body 12 so as to correspond to the center projection 20T. The center projection 20T engages with the wide-shaped portion of the body 12 so as to perform a centering of the outer peripheral seal member 20 in the longitudinal direction.

Sixth pattern portions S6 smoothly connect the fifth pattern portion S5 having the wide shape to the two side portions 20B each having the narrow shape. The engagement projection 6Q is inserted and fitted to the groove 24 of each of the sixth pattern portions S6 so that the sixth pattern portion S6 engages with the engagement projection 6Q in the vicinity of a boundary between intermediate portions 22g and contact portions 23g of the sixth pattern portion S6. Accordingly, the fifth pattern portion S5 and the sixth pattern portions S6 are fitted to or engage with the engagement projection 6Q to thereby appropriately and correctly position the center portion 20A relative to the body 12 in a direction perpendicular to the divided surface constituted by the body 12.

A vertical vibration or a rotational vibration of the body 12 in the vicinity of the tip end portion thereof is large because of a vibration or a pulsation pressure difference applied to the valve element 14 or the body 12 that supports the valve element 14. However, as mentioned above, the engagement projection 6Q is fitted to the grooves 24 each having a U-shape that are formed at the center portion 20A of the outer peripheral seal member 20, thereby restraining the vibration of the body 12. In addition, in a case where the air intake control valve 10 is mounted to the surge tank 5, a self-centering of the air intake control valve 10 relative to the cutout 6p of the surge tank 5 is achieved because of the fitting between the grooves 24 and the engagement projection 6Q. Further, because the outer peripheral seal member 20 is provided, no direct contact is obtained between the body 12 and the end surface 6f, thereby inhibiting a malfunction such as an interfering noise.

In the aforementioned embodiment, the pair of first contact portions 23d of each of the first pattern portions S1 may be arranged in parallel to each other, the pair of second contact portions 23f of each of the second pattern portions S2 may be arranged in parallel to each other, and the third contact portions 23e of each of the third pattern portions S3 may be arranged in parallel to each other as in the same way as the pair of first intermediate portions 22d, the pair of second intermediate portions 22f, and the pair of third intermediate portions 22e while the contact portions 23d, 23e, and 23f are each in a natural state so as not to receive the external force. Then, in the case where the air intake control valve 10 is inserted and mounted to the surge tank 5, the first to third contact portions 23d, 23f, and 23e may be deformed to be positioned closer to the body 12 by hand or by a jig so as to be mounted to the body 12 of the air intake control valve 10.

In addition, the single first intermediate portion 22d may extend from the first fitting portion 21d, the single second intermediate portion 22f may extend from the second fitting portion 21f, and the single third intermediate portion 22e may extend from the third fitting portion 21e. Then, the pair of first contact portions 23d may extend from an end of the single first intermediate portion 22d in a direction opposite from each other relative to the divided surface constituted by the body 12. In addition, the pair of second contact portions 23f may extend from an end of the single second intermediate portion 22f in a direction opposite from each other relative to the divided surface constituted by the body 12. Further, the pair of third contact portions 23e may extend from an end of the single third intermediate portion 22e in a direction opposite from each other relative to the divided surface constituted by the body 12.

Figure 8A:
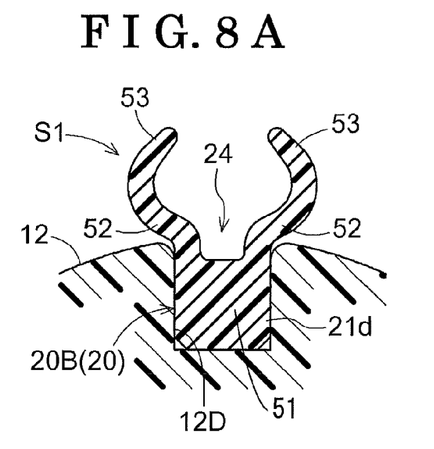
FIGS. 8A and 8B are cross-sectional views illustrating operations of the outer peripheral seal member according to another embodiment.
Figure 8B:
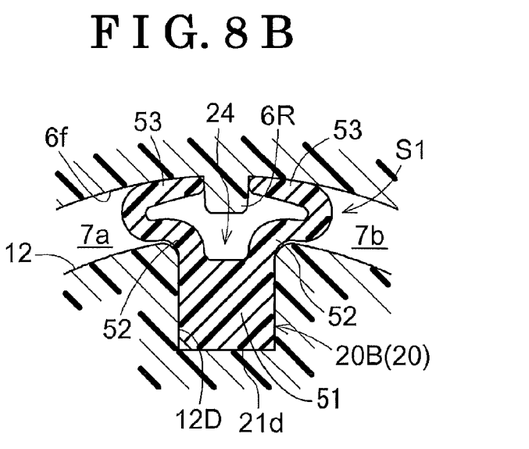

As illustrated in FIG. 8A, one of a pair of intermediate portions 52 and one of a pair of contact portions 53, and the other of the pair of intermediate portions 52 and the other of the pair of contact portions 53 may extend from both side edges at an upper portion of a fitting portion 51 so as to form an arc shape towards a center line of the outer peripheral seal member 20. At this time, a projection 6R is formed at the end surface 6f of the partition wall 6 so as to extend along the two side portions 20B. In the case where the air intake control valve 10 is fitted and mounted to the surge tank 5, outer side surfaces of the pair of contact portions 53 are pressed against the end surface 6f as illustrated in FIG. 8B. Then, when the pressure in one of the surge chambers 7a and 7b increases, the ends of the pair of contact portions 53 are pressed against corners each formed between a side surface of the projection 6R and the end surface 6f, thereby maintaining the air sealed state.

In the embodiment illustrated in FIGS. 5 to 7, in the bent portions of the two side portions 20B of the outer peripheral seal member 20, the tip ends of the first contact portions 23d are arranged to be close to each other in association with the increase of the curvature radius of the curved portions of the body 12 in a state before the outer peripheral seal member 20 is bent and deformed. In the same way, the tip ends of the second contact portions 23*f* are arranged to be close to each other in association with the increase of the curvature radius of the curved portions of the body 12 in a state before the outer peripheral seal member 20 is bent and deformed. Alternatively, as illustrated in FIG. 8A, the tip ends of the contact portions 53 may be arranged to be away from each other in association with the decrease of the curvature radius in a state before the outer peripheral seal member 20 is bent and deformed. Then, when the two side portions 20B are bent and deformed so as to mount the outer peripheral seal member 20 to the body 12, the contact portions 53 are appropriately bent towards the body 12. As a result, a distance between the two contact portions 53 in the bent portions of the two side portions 20B is substantially equal to a distance between the two contact portions 53 in the straight portions of the two side portions 20B, thereby obtaining an appropriate contact state relative to the end surface 6*f*.

Accordingly, while a contact pressure generated between the sealed end surface 6*f* (the sealed surface) and the outer peripheral seal member 20 is reduced, the air leakage between the first and second surge chambers 7*a* and 7*b* when the valve element 14 is in the fully closed state is sufficiently restrained.

According to the aforementioned embodiment, the air intake control valve 10 includes the body 12 extending to divide the inner portion of the surge tank 5 of the multi-cylinder internal combustion engine into two portions, the body 12 serving as the divided surface to divide the inner portion of the surge tank 5 into the two portions, the valve element 14 operated to rotate for opening and closing the fluid passage 10A formed at the body 12, and the seal member 20 sealing between the sealed surface 6*f* of the surge tank 5 and the outer periphery of the body 12, the seal member 20 including the seal portions constituted by the pairs of contact portions 23*d*, 23*f*, and 23*e* (53) that make contact with the end surface 6*f* in a state where each of the pairs of contact portions 23*d*, 23*f*, 23*e* (53) extend in directions opposite from each other relative to the divided surface.

According to the air intake control valve 10 having the aforementioned structure, the pair of first contact portions 23*d* extend obliquely in the upward direction so as to be away from each other, the pair of second contact portions 23*f* extend obliquely in the upward direction so as to be away from each other, and the pair of third contact portions 23*e* extend obliquely in the upward direction so as to be away from each other from an initial state before the outer peripheral seal member 20 receives the external force. The pair of contact portions 53 is also configured in the aforementioned manner. Thus, in a case where the air intake control valve 10 is inserted and mounted to the surge tank 5, the first to third contact portions 23*d*, 23*f*, and 23*e* (and the contact portions 53) are bent and deformed so as to be easily positioned close to the body 12, thereby smoothly mounting the air intake control valve 10 to the surge tank 5. In addition, because the reaction force applied to the body 12 from the outer peripheral seal member 20 is small in the process of attaching the air intake control valve 10 to the surge tank 5 and after the air intake control valve 10 is attached to the surge tank 5, the deformation of the body 12 caused by the aforementioned reaction fore is restrained. As a result, the adverse affect on the sealing ability between the body 12 and the cutout 6*p*, between the body 12 and the valve element 14, and the like based on the deformation of the body 12 may be avoided. After the air intake control valve 10 is mounted to the surge tank 5, the first, second, and third contact portions 23*d*, 23*f*, and 23*e* (and the contact portions 53) are pressed against the end surface 6*f* of the partition wall 6 by means of a relatively weak restoring force of the first, second, and third intermediate portions 22*d*, 22*f*, and 22*e* (and the intermediate portions 52). However, in a state where the valve element 14 is in the fully closed state, the sealing ability is automatically enhanced and the high air tightness is maintained because one of the pair of first contact portions 23*d*, one of the pair of second contact portions 23*f*, and one of the pair of third contact portions 23*e* (and one of the pair of contact portions 53) facing one of the first and second surge chambers 7*a* and 7*b* having the higher pressure are strongly pressed against the end surface 6*f* by means of the air pressure. In a state where the air intake control valve 10 is mounted to the surge tank 5, only the tip ends of the contact portions 23*d*, 23*f*, and 23*e* (and the contact portions 53) make contact with the end surface 6*f*.

In addition, according to the aforementioned embodiment, the outer peripheral seal member 20 includes the fitting portions 21*d*, 21*f*, and 21*e* supported by the body 21 and pairs of intermediate portions 22*d*, 22*f*, and 22*e* extending from the respective fitting portions 21*d*, 21*f*, and 21*e* to the end surface 6*f*. The pairs of contact portions 23*d*, 23*e*, and 23*f* extend from the respective pairs of intermediate portions 22*d*, 22*f*, and 22*e* respectively.

Accordingly, the intermediate portions 22*d*, 22*f*, and 22*e* in addition to the contact portions 23*d*, 23*f*, and 23*e* are elastically deformed towards the body 12 by the contact with the end surface 6*f* in the case of attaching the air intake control valve 10 to the surge tank 5. Thus, the insertion load is further reduced to thereby further smoothly mounting the air intake control valve 10 to the surge tank 5. Further, as compared to a case where the two contact portions extend from the single intermediate portion from the fitting portion, the fatigue resistance of the outer peripheral seal member 20 increases according to the embodiment because a stress amplitude at a base portion of each of the intermediate portions represents a half amplitude.

Further, according to the aforementioned embodiment, the first and second intermediate portions 22*d* and 22*f* serve as the deformation portions that are initially elastically deformed by the contact with the end surface 6*f* in the case of attaching the air intake control valve 10 to the end surface 6*f*.

Accordingly, in the case of attaching the air intake control valve 10 to the surge tank 5, the first and second intermediate portions 22*d* and 22*f* connecting the first and second fitting portions 21*d* and 21*f* to the first and second contact portions 23*d* and 23*f* respectively are initially elastically deformed prior to the other portions by the contact between the first and second contact portions 23*d* and 23*f* and the end surface 6*f*. Because the first and second contact portions 23*d* and 23*f* are not easily deformed, only the tip ends of the first and second contact portions 23*d* and 23*f* make contact with the end surface 6*f*. As a result, the contact area of the outer peripheral seal member 20 relative to the end surface 6*f* is limited to portions in the vicinity of the tip ends of the first and second contact portions 23*d* and 23*f*, which leads to the decrease of the insertion load. The productivity is improved and an investment in facility for a large insertion load of the air intake control valve 10 is avoidable. Further, because of the decrease of the insertion load, a quality defect such as a dislocation or disengagement of the outer peripheral seal member 20 when the air intake control valve 10 is assembled to the surge tank 5 is avoidable.

Furthermore, according to the aforementioned embodiment, the first and second intermediate portions 22*d* and 22*f* and the tip ends of the first and second contact portions 23*d* and 23*f* serve as the deformation portions that are easily deformed by the contact with the end surface 6f in the case of attaching the air intake control valve 10 to the sealed surface 6f.

In the case of attaching the air intake control valve 10 to the surge tank 5, the first and second intermediate portions 22d and 22f connecting the first and second fitting portions 21d and 21f to the first and second contact portions 23d and 23f, and the tip ends of the first and second contact portions 23d and 23f are easily elastically deformed by the contact with the end surface 6f while portions at base sides of the first and second contact portions 23d and 23f and the like are not easily elastically deformed. Thus, in the process of attaching the air intake control valve 10 to the surge tank 5, only the tip ends of the first and second contact portions 23d and 23f make contact with the end surface 6f. As a result, the contact area of the outer peripheral seal member 20 relative to the end surface 6f is minimized and the insertion load is recued, which may increase the productivity and avoid the investment in facility for the large insertion load of the air intake control valve 10. In addition, because of the decrease of the insertion load, a quality defect such as a dislocation or disengagement of the outer peripheral seal member 20 when the air intake control valve 10 is assembled to the surge tank 5 is avoidable. Further, not only the first and second intermediate portions 22d and 22f but also the tip ends of the first and second contact portions 23d and 23f are easily elastically deformed, thereby easily ensure the sealing ability when the surge chambers 7a and 7b are in the low pressure.

Furthermore, according to the aforementioned embodiment, each of the pair of contact portions 23d, 23e and 23f extends to gradually open outwardly towards the end surface 6f before the air intake control valve 10 is mounted to the surge tank 5.

Accordingly, in the process of attaching the air intake control valve 10 to the surge tank 5, is it not necessary to manually adjust or assist the first to third contact portions 23d, 23f, and 23e to be bent and deformed in predetermined respective directions. In addition, after the air intake control valve 10 is mounted to the surge tank 5, the pair of first contact portions 23d makes contact with the end surface 6f in such a manner that the pair of first contact portions 23d are gradually away from each other while being positioned closer to the end surface 6f. The pair of second contact portions 23f and the pair of third contact portions 23e are operated in the same manner as the pair of first contact portions 23d. Thus, as compared to a case where the contact portions gradually approach each other while being positioned closer to the end surface, the contact portions positioned close to either the surge chamber 7a or 7b having the higher pressure are pressed against the end surface 6f by the air pressure, thereby maintaining the high sealing ability.

Furthermore, according to the aforementioned embodiment, the body 12 includes the curved portion curved along the divided surface while the seal member 20 includes the bent portion bent and deformed along the curved portion of the body 12 so as to be mounted to the end surface 6f. The distance between each of the pair of first and second contact portions 23d and 23f in the bent portion of the seal member 20 varies in association with the decrease of the curvature radius of the curved portion in a state before the bent portion of the seal member 20 is bent and deformed so as to be mounted to the end surface 6f.

In the bent portions of the outer peripheral seal member 20 attached to the curved portions of the body 12 having the small curvature radius, the first and second contact portions 23d and 23f may be folded down towards the body 12. Thus, after the air intake control valve 10 is mounted to the surge tank 5, the appropriate contact of the outer peripheral seal member 20 relative to the end surface 6f may not be obtained. However, according to the aforementioned structure, in the bent portions of the outer peripheral seal member 20, the tip ends of the pair of first contact portions 23d are arranged to be close to each other or to be away from each other in association with the decrease of the curvature radius of the curved portions of the body 12 in a sate before the outer peripheral seal member 20 is bent and deformed. The pair of second contact portions 23f in the bent portions of the outer peripheral seal member 20 is configured in the same manner as the first contact portions 23d. Then, in a case where the first and second contact portions 23d and 23f in the bent portions of the outer peripheral seal member 20 are bent and deformed so that the outer peripheral seal member 20 is mounted to the surge tank 5, the contact portions 23d and 23f are appropriately folded and bent towards the body 12. Then, the pair of first contact portions 23d in the bent portions of the outer peripheral seal member 20 is positioned to be away from each other by a distance which is substantially the same as a distance by which the pair of first contact portions 23d in the straight portions of the outer peripheral seal member 20 is positioned to be away from each other. The pair of second contact portions 23f in the bent portions of the outer peripheral seal member 20 is operated in the same manner as the first contact portions 23d. As a result, the appropriate contact of the first and second contact portions 23d and 23f of the outer peripheral seal member 20 relative to the end surface 6f is obtained.

Furthermore, according to the aforementioned embodiment, the body 12 includes the curved portion curved along the divided surface while the seal member 20 includes the bent portion bent and deformed along the curved portion of the body 12 so as to be mounted to the end surface 6f. The extending length of each of the first and second contact portions 23d and 23f increases in association with the decrease of the curvature radius of the curved portion in a state before the bent portion of the seal member 20 is bent and deformed so as to be mounted to the end surface 6f.

In the bent portions of the outer peripheral seal member 20 attached to the curved portions of the body 12 having the small curvature radius, the first and second contact portions 23d and 23f may be folded down towards the body 12. Thus, after the air intake control valve 10 is mounted to the surge tank 5, the appropriate contact of the outer peripheral seal member 20 relative to the end surface 6f may not be obtained. However, according to the aforementioned structure, in the bent portions of the outer peripheral seal member 20, the extending length of each of the first and second contact portions 23d and 23f in the bent portions of the outer peripheral seal member 20 may be longer than the extending length of each of the first and second contact portions 23d and 23f in the straight portions of the outer peripheral seal member 20 in a state before the outer peripheral seal member 20 is bent and deformed. Therefore, when the outer peripheral seal member 20 is bent and deformed so that the air intake control valve 10 is mounted to the surge tank 5, the first and second contact portions 23d and 23f are appropriately folded towards the body 12 so that the extending length of each of the first and second contact portions 23d and 23f in the bent portions of the outer peripheral seal member 20 is substantially equal to the extending length of each of the first and second contact portions 23d and 23f in the straight portions of the outer peripheral seal member 20. As a result, the appropriate contact of the first and second contact portions 23d and 23f of the outer peripheral seal member 20 relative to the end surface 6f is obtained.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An air intake control valve, comprising:
   a body configured to be mounted in an inner portion of a surge tank of a multi-cylinder internal combustion engine to divide the inner portion of the surge tank into two portions, the body serving as a divided surface to divide the inner portion of the surge tank into the two portions when the air intake control valve is mounted to the surge tank;
   a valve element operated to rotate for opening and closing a fluid passage formed at the body when the air intake control valve is mounted to the surge tank;
   a seal member configured to seal between a sealed surface of the surge tank and an outer periphery of the body, the seal member including a seal portion constituted by two contact portions that make contact with the sealed surface in a state in which the air intake control valve is mounted to the surge tank and the two contact portions extend in directions opposite from each other relative to the divided surface; and
   the air intake control valve being configured so that when the air intake control valve is mounted to the surge tank and one of the contact portions faces one of the two portions of the surge tank having a higher air pressure than the other one of the two portions of the surge tank, the contact portion that faces the one portion of the surge tank having the higher air pressure than the other one of the two portions of the surge tank is pressed against the sealed surface by the higher air pressure.

2. The air intake control valve according to claim 1, wherein the seal member includes a supported portion supported by the body and two intermediate portions extending from the supported portion to the sealed surface, and the two contact portions extend from the two intermediate portions respectively.

3. The air intake control valve according to claim 2, wherein the two intermediate portions serve as deformation portions that are initially elastically deformed by a contact with the sealed surface in a case of attaching the air intake control valve to the sealed surface.

4. The air intake control valve according to claim 3, wherein the two contact portions extend to gradually open outwardly towards the sealed surface before the air intake control valve is mounted to the surge tank.

5. The air intake control valve according to claim 3, wherein the body includes a curved portion curved along the divided surface while the seal member includes a bent portion bent and deformed along the curved portion of the body so as to be mounted to the sealed surface, and wherein a distance between the two contact portions in the bent portion of the seal member varies in association with a decrease of a curvature radius of the curved portion in a state before the bent portion of the seal member is bent and deformed so as to be mounted to the sealed surface.

6. The air intake control valve according to claim 3, wherein the body includes a curved portion curved along the divided surface while the seal member includes a bent portion bent and deformed along the curved portion of the body so as to be mounted to the sealed surface, and wherein an extending length of each of the two contact portions increases in association with a decrease of a curvature radius of the curved portion in a state before the bent portion of the seal member is bent and deformed so as to be mounted to the sealed surface.

7. The air intake control valve according to claim 2, wherein the two intermediate portions and tip ends of the two contact portions serve as the deformation portions that are easily deformed by the contact with the sealed surface in the case of attaching the air intake control valve to the sealed surface.

8. The air intake control valve according to claim 4, wherein the two contact portions extend to gradually open outwardly towards the sealed surface before the air intake control valve is mounted to the surge tank.

9. The air intake control valve according to claim 7, wherein the body includes a curved portion curved along the divided surface while the seal member includes a bent portion bent and deformed along the curved portion of the body so as to be mounted to the sealed surface, and wherein a distance between the two contact portions in the bent portion of the seal member varies in association with a decrease of a curvature radius of the curved portion in a state before the bent portion of the seal member is bent and deformed so as to be mounted to the sealed surface.

10. The air intake control valve according to claim 7, wherein the body includes a curved portion curved along the divided surface while the seal member includes a bent portion bent and deformed along the curved portion of the body so as to be mounted to the sealed surface, and wherein an extending length of each of the two contact portions increases in association with a decrease of a curvature radius of the curved portion in a state before the bent portion of the seal member is bent and deformed so as to be mounted to the sealed surface.

11. The air intake control valve according to claim 2, wherein the two contact portions extend to gradually open outwardly towards the sealed surface before the air intake control valve is mounted to the surge tank.

12. The air intake control valve according to claim 2, wherein the body includes a curved portion curved along the divided surface while the seal member includes a bent portion bent and deformed along the curved portion of the body so as to be mounted to the sealed surface, and wherein a distance between the two contact portions in the bent portion of the seal member varies in association with a decrease of a curvature radius of the curved portion in a state before the bent portion of the seal member is bent and deformed so as to be mounted to the sealed surface.

13. The air intake control valve according to claim 2, wherein the body includes a curved portion curved along the divided surface while the seal member includes a bent portion bent and deformed along the curved portion of the body so as to be mounted to the sealed surface, and wherein an extending length of each of the two contact portions increases in association with a decrease of a curvature radius of the curved portion in a state before the bent portion of the seal member is bent and deformed so as to be mounted to the sealed surface.

14. The air intake control valve according to claim 1, wherein the two contact portions extend to gradually open outwardly towards the sealed surface before the air intake control valve is mounted to the surge tank.

15. The air intake control valve according to claim 14, wherein the body includes a curved portion curved along the divided surface while the seal member includes a bent portion bent and deformed along the curved portion of the body so as to be mounted to the sealed surface, and wherein a distance between the two contact portions in the bent portion of the seal member varies in association with a decrease of a curvature radius of the curved portion in a state before the bent portion of the seal member is bent and deformed so as to be mounted to the sealed surface.

16. The air intake control valve according to claim 14, wherein the body includes a curved portion curved along the divided surface while the seal member includes a bent portion bent and deformed along the curved portion of the body so as to be mounted to the sealed surface, and wherein an extending length of each of the two contact portions increases in association with a decrease of a curvature radius of the curved portion in a state before the bent portion of the seal member is bent and deformed so as to be mounted to the sealed surface.

17. The air intake control valve according to claim 1, wherein the body includes a curved portion curved along the divided surface while the seal member includes a bent portion bent and deformed along the curved portion of the body so as to be mounted to the sealed surface, and wherein a distance between the two contact portions in the bent portion of the seal member varies in association with a decrease of a curvature radius of the curved portion in a state before the bent portion of the seal member is bent and deformed so as to be mounted to the sealed surface.

18. The air intake control valve according to claim 1, wherein the body includes a curved portion curved along the divided surface while the seal member includes a bent portion bent and deformed along the curved portion of the body so as to be mounted to the sealed surface, and wherein an extending length of each of the two contact portions increases in association with a decrease of a curvature radius of the curved portion in a state before the bent portion of the seal member is bent and deformed so as to be mounted to the sealed surface.

19. An air intake control valve comprising:
a body dividing an inner portion of a surge tank into two portions when the air intake control valve is mounted to the surge tank;
a valve element operated to rotate for opening and closing a fluid passage formed at the body when the air intake control valve is mounted to the surge tank;
a seal member configured to seal between a sealed surface of the surge tank and an outer periphery of the body, the seal member including a seal portion constituted by two contact portions that make contact with the sealed surface in a state in which the air intake control valve is mounted to the surge tank and the two contact portions extend in directions away from each other; and
the air intake control valve being configured so that when the air intake control valve is mounted to the surge tank and one of the contact portions faces one of the two portions of the surge tank having a higher air pressure than the other one of the two portions of the surge tank, the contact portion that faces the one portion of the surge tank having the higher air pressure than the other one of the two portions of the surge tank is pressed against the sealed surface by the higher air pressure.

20. An air intake control valve mounted to a surge tank of a multi-cylinder internal combustion engine, the air intake control valve comprising:
a body positioned in an inner portion of the surge tank to divide the inner portion of the surge tank into two portions;
a rotatable valve element mounted on the body to open and close a fluid passage formed in the body;
a seal member mounted on the outer periphery of the body and comprising two spaced apart and projecting contact portions each possessing a side surface contacting a sealed surface of the surge tank and each possessing a configuration that is deformed relative to the configuration of the contact portions before the body is positioned in the inner portion of the surge tank, the respective side surfaces of the two contact portions being in sealing contact with the sealed surface of the surge tank to provide an air-tight seal between the body and the surge tank; and
the contact portions being configured so that when one of the two portions of the surge tank has a higher air pressure than the other one of the two portions of the surge tank, the side surface of the contact portion facing the portion of the surge tank having the higher air pressure is pressed against and follows a contour of the sealed surface by the higher air pressure.

* * * * *